A. CRAFT.
LUBRICATING DEVICE FOR STEAM ENGINES.
No. 10,153. Reissued July 11, 1882.
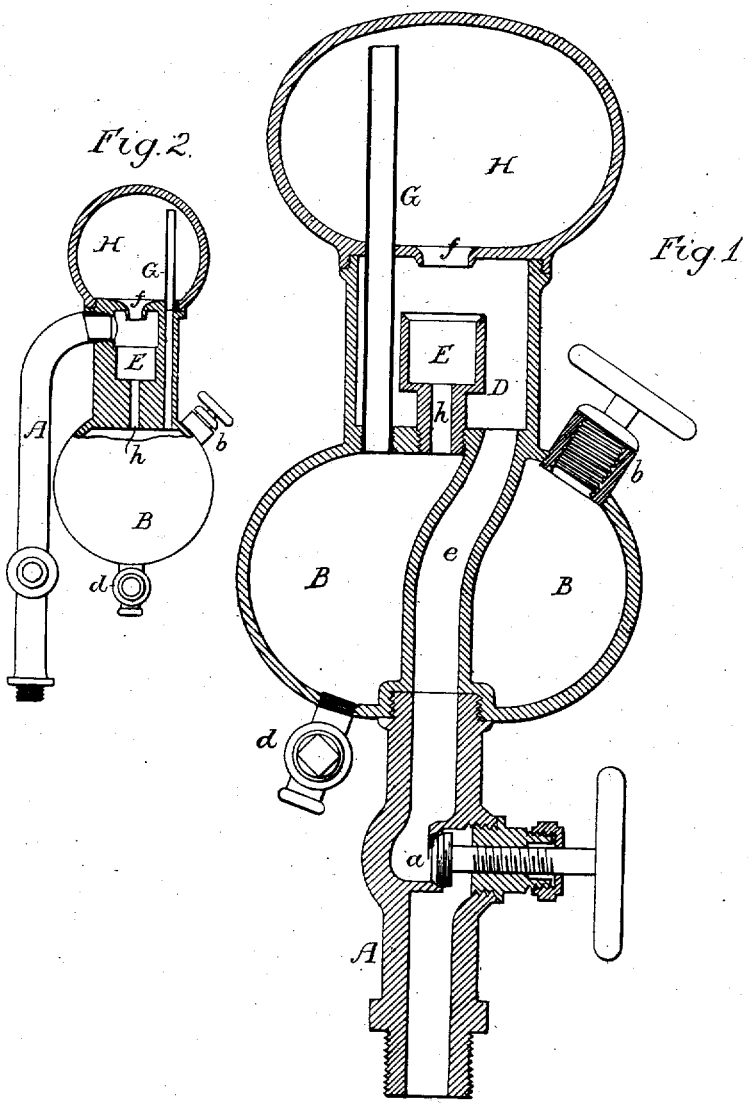
Witnesses
Harry Drury
Harry Smith
Inventor
Alfred Craft
by his Attorneys
Howson and Sons
N. PETERS, Photo-Lithographer, Washington, D. C.

UNITED STATES PATENT OFFICE.

ALFRED CRAFT, OF NORRISTOWN, PENNSYLVANIA.

LUBRICATING DEVICE FOR STEAM-ENGINES.

SPECIFICATION forming part of Reissued Letters Patent No. 10,153, dated July 11, 1882.

Original No. 241,936, dated May 24, 1881. Application for reissue filed June 16, 1882.

*To all whom it may concern:*

Be it known that I, ALFRED CRAFT, a citizen of the United States, and a resident of Norristown, Montgomery county, Pennsylvania, have invented certain Improvements in Lubricating Devices for Steam-Engines, of which the following is a specification.

My invention relates to the lubrication of the valves of steam-engines; and its main object is to so construct a lubricator or oil-cup that oil in proper quantity will be gradually fed into the valve-chest or steam-pipe.

Figure 1 in the accompanying drawings represents an oil-cup by which my invention may be carried into effect, Fig. 2 being a modified form of oil-cup.

It will be seen hereinafter that the construction of the cup may be varied without losing its function of automatically discharging oil into the chest.

In Fig. 1 the tubular stem A of the cup is threaded at its lower end for attachment to the steam-chest of the engine, and this stem is provided with a valve, *a*. To the upper end of the stem is attached an oil-reservoir, B, having a suitable outlet-opening, *b*, provided with a detachable plug, and having a discharge-cock, *d*. Above the reservoir B is a chamber, D, communicating directly with the tubular stem through a pipe or passage, *e*, which has no direct communication with the oil-reservoir B. Within the chamber D is another reservoir, E, which I will term the "receiver," and this has a direct communication with the oil-reservoir through a contracted passage, *h*. A vent pipe or passage, G, extends from the oil-reservoir nearly to the top of the condenser H, the latter having a central opening, *f*, immediately above the receiver E.

Oil having been poured into the reservoir B through the inlet *b*, and the latter having been closed by its screw-plug, the valve *a* is opened, thereby permitting steam from the chest of the engine, which we will suppose to be in motion, to pass into the chamber D and condenser H, where a partial condensation of steam takes place, the water of condensation falling into the receiver E, taking its course through the contracted passage *h*, and finding its way to the bottom of the oil-reservoir, and thus raising the oil in the vent-tube G. This goes on until the receiver E is filled with water and the oil rises in the vent-tube to a level with the water in the said receiver E, after which, owing to the pulsations of steam in the valve-chest, due to the action of the valve in respect to the ports of the cylinder, there will be a vertically-moving column of oil and water in the contracted passage *h*, the agitation of the oil and water causing a certain displacement of one by the other in said passage, so that oil will find its way up through the passage *h* and through the receiver E to the surface of the water therein, thence overflowing and passing down through the passage *e* to the valve-chest, which is thus kept supplied with oil as long as the pulsations of steam in the chest continue to cause the agitation of the oil and water. An amount of water equal to the amount of oil displaced will find its way into the reservoir B, and will descend to the bottom of the oil therein.

It should be understood that when there are no pulsations of steam there will be no agitation in the contracted passage *h*, and the water and oil will not change places in said passage. Any excess of water of condensation will overflow into the chamber D, and must pass thence into the valve-chest of the engine. This will be the condition of affairs when the throttle-valve is open and the engine is in motion; but as soon as the throttle-valve is closed and the interior of the oil-cup is released from the pressure of steam (the engine still running) the water in the receiver E and passage *h* will be instantly converted into steam, the oil in the vent-tube G will fall, and oil will ascend through the contracted passage *h* into the receiver E and partly fill the same. When the throttle-valve is again opened steam will be admitted to the oil-cup, as before, condensation will take place in the chamber H, and water will fall into the receiver E, and, displacing the oil therein, will cause it to pass into the chamber D, and thence to the steam-chest. The receiver E will be filled with the water of condensation, and the oil will rise in the pipe G to a corresponding level prior to a repetition of the above-described operations.

The quantity of oil discharged on each closing of the throttle-valve can be regulated by properly proportioning the capacity of the receiver E in respect to that of the lower portion of the tube G.

The tube G serves two purposes: First, it causes the oil in said tube to maintain the same level as the water in the receiver E, and, second, it serves the purpose of a vent-tube for the oil-reservoir B.

I claim as my invention—

1. The combination, in an oil-cup, of the following elements: first, an oil-reservoir; second, a condenser; third, a tube, G, and, fourth, a contracted passage through which the water of condensation must find its way to gain access to the oil-reservoir, and through which, also, the oil must find its way in passing from the reservoir to the steam-chest, all substantially as set forth.

2. An oil-cup in which the following elements are combined, namely: first, an oil-reservoir; second, a condenser communicating with the steam-chest or steam pipe or space of a steam-engine; third, a tube, G, and, fourth, a receiver for the water of condensation, the said receiver communicating with the oil-reservoir through a contracted passage, all substantially as set forth.

In testimony whereof I have signed my name to this specification in the presence of two subscribing witnesses.

ALFRED CRAFT.

Witnesses:
HARRY DRURY,
HARRY SMITH.